US008397505B2

(12) United States Patent
Penciu

(10) Patent No.: US 8,397,505 B2
(45) Date of Patent: Mar. 19, 2013

(54) APPARATUS FOR COLLECTING SOLAR ENERGY FOR CONVERSION TO ELECTRICAL ENERGY

(75) Inventor: Cristian Penciu, Dallas, TX (US)

(73) Assignee: Pulsar Energy, Inc., Dallas, TX (US)

( * ) Notice: Subject to any disclaimer, the term of this patent is extended or adjusted under 35 U.S.C. 154(b) by 762 days.

(21) Appl. No.: 12/212,408

(22) Filed: Sep. 17, 2008

(65) Prior Publication Data
US 2009/0071466 A1 Mar. 19, 2009

Related U.S. Application Data

(60) Provisional application No. 60/993,946, filed on Sep. 17, 2007, provisional application No. 61/011,298, filed on Jan. 16, 2008, provisional application No. 61/063,508, filed on Feb. 4, 2008, provisional application No. 61/066,371, filed on Feb. 20, 2008.

(51) Int. Cl.
*B60K 16/00* (2006.01)
*F24J 2/12* (2006.01)

(52) U.S. Cl. .................... 60/641.15; 60/641.8; 126/690; 126/694

(58) Field of Classification Search .... 60/641.8–641.15; 126/690, 694
See application file for complete search history.

(56) References Cited

U.S. PATENT DOCUMENTS

| | | | |
|---|---|---|---|
| 3,117,414 A | 1/1964 | Daniels et al. | |
| 3,182,654 A * | 5/1965 | Culling | 126/600 |
| 4,002,032 A * | 1/1977 | Bash | 60/641.15 |
| 4,038,972 A * | 8/1977 | Orrison | 126/578 |
| 4,160,523 A * | 7/1979 | Stevens | 126/625 |
| 4,168,696 A | 9/1979 | Kelly | |
| 4,173,123 A | 11/1979 | Gurtler | |
| 4,229,660 A | 10/1980 | Adler | |
| 4,271,822 A * | 6/1981 | Radebold | 126/697 |
| 4,452,047 A | 6/1984 | Hunt et al. | |
| 4,475,538 A | 10/1984 | Percival et al. | |
| 4,682,582 A | 7/1987 | Zsida | |
| 4,821,516 A | 4/1989 | Isshiki | |
| 5,089,055 A | 2/1992 | Nakamura | |
| 5,365,920 A * | 11/1994 | Lechner | 126/696 |
| 5,593,549 A | 1/1997 | Stirbl et al. | |
| 5,809,784 A | 9/1998 | Kreuter | |
| 6,080,927 A | 6/2000 | Johnson | |
| 6,700,054 B2 | 3/2004 | Cherney et al. | |
| 6,735,946 B1 | 5/2004 | Otting et al. | |
| 6,775,982 B1 | 8/2004 | Kitamura et al. | |
| 6,818,818 B2 | 11/2004 | Barels | |
| 7,227,077 B2 | 6/2007 | Kleinwachter | |
| 2006/0037606 A1 | 2/2006 | Singh | |

OTHER PUBLICATIONS

PCT.ISA.220—International Search Report; File Reference 4902 PCT, International Application No. PCT/US09/57104, filed Sep. 16, 2009.

* cited by examiner

*Primary Examiner* — Hoang Nguyen

(74) *Attorney, Agent, or Firm* — Clements Bernard PLLC; Lawrence A. Baratta, Jr.; Christopher L. Bernard

(57) ABSTRACT

The present disclosure provides an apparatus for collecting solar energy for electrical energy generation through one or more thermodynamic closed-cycle heat engines or the like. The present invention includes new designs for solar collectors that concentrate solar energy, and mechanisms for transporting and transferring the concentrated solar energy directly into the working fluid (e.g., a liquid, a gas, or a phase change substance) of the closed cycle thermodynamic engines without heating the outside surface of the engines. In an exemplary embodiment, the present utilizes an inflatable design for a dual-surface reflector which provides low cost and weight, protection from external elements, and the ability to inflate/deflate as required.

20 Claims, 8 Drawing Sheets

Top View

Side View

APPARATUS FOR COLLECTING SOLAR ENERGY FOR CONVERSION TO ELECTRICAL ENERGY

CROSS-REFERENCE TO RELATED APPLICATION(S)

The present non-provisional patent application claims priority to U.S. Provisional Patent Application Ser. No. 60/993,946, filed Sep. 17, 2007, entitled "METHOD AND APPARATUS FOR CONVERTING SOLAR ENERGY INTO ELECTRICAL ENERGY," to U.S. Provisional Patent Application Ser. No. 61/011,298, filed Jan. 16, 2008, entitled "METHOD AND APPARATUS FOR CONVERTING SOLAR ENERGY INTO ELECTRICAL ENERGY USING CLOSED-CYCLE THERMODYNAMIC ENGINES AND PIEZO-ELECTRIC GENERATORS," to U.S. Provisional Patent Application Ser. No. 61/063,508, filed Feb. 4, 2008, entitled "METHOD AND APPARATUS FOR CONVERTING SOLAR ENERGY INTO ELECTRICAL ENERGY USING MULTIPLE CLOSED-CYCLE THERMODYNAMIC ENGINE AND PIEZO-ELECTRIC GENERATORS," and to U.S. Provisional Patent Application Ser. No. 61/066,371, filed Feb. 20, 2008, entitled "METHOD AND APPARATUS FOR CONVERTING ELECTROMAGNETIC ENERGY INTO ELECTRIC AND THERMAL ENERGY USING A CLOSED-CYCLE THERMODYNAMIC ENGINE AND ELECTRIC GENERATOR," all of which are incorporated in full by reference herein.

FIELD OF THE INVENTION

The present invention relates generally to solar energy. More particularly, the present invention provides an apparatus for collecting solar energy for use in electrical energy generation through closed-cycle thermodynamic engines or the like.

BACKGROUND OF THE INVENTION

Solar energy is one of the renewable energy sources that does not pollute, it is free, and available virtually everywhere in the world. For these reasons, over the years there have been many systems and methods that attempted to utilize solar energy and convert it into other usable forms of energy such as electricity. More recently, due to perceived shortages and higher prices of fossil fuels and due to pollution concerns, the interest has increased and the pace of development of technologies that utilize alternative energy sources (such as solar) has accelerated.

There are two main techniques developed to harvest solar energy. The first technique utilizes photovoltaic solar cells to directly convert solar energy into electricity. The photovoltaic solar cells have the advantage of small size, but are expensive to manufacture and the price per watt has leveled due to the high cost of the semiconductor substrate utilized to construct the photovoltaic solar cells. There are many types of designs and materials used to make photovoltaic solar cells which affect their cost and conversion efficiency. Current commercially available solar cells typically reach a starting efficiency around 18% which drops over time. The cells produce direct current (DC) that needs to be regulated, and for higher power applications typically the DC current also needs to be converted to AC current.

The second technique utilizes the heat (infrared radiation) associated with the solar energy. Assuming that the goal is to generate electrical energy, the solar radiation gets collected, concentrated, and utilized as a heat source for various systems that convert the heat into mechanical energy, which is then converted into electrical energy. Successful machines developed to convert heat into mechanical energy can be based on thermodynamic cycles such as the Stirling cycle and the Rankine cycle or variations of these. Mechanical energy produced by these machines is further converted into electrical energy by using rotating generators or linear generators. For example, in the case of a Stirling engine, heat (which can come from any heat source) is applied at one end of the engine and cooling is provided at a different location. The working fluid (gas), which is sealed inside the engine, goes through a cycle of heating (expansion) and cooling (contraction). The cycle forces a piston inside the engine to move and produce mechanical energy. When the heat source is solar, successful engine designs use an intermediate medium such as molten salt to more uniformly distribute the heat around the outside surface of the heating end of the engine.

With respect to the second technique and more specifically referring to Stirling engines, problems arise when the surface of the engine is exposed to large temperature gradients due to close proximity of the heat and cooling sources on the surface of the engine. For example, conventional engines can see extreme temperatures from day to night and along the length of the engine body with temperatures ranging from over 1000 degrees Fahrenheit to room temperature across the engine body. Disadvantageously, these types of engines face difficult material problems such as weld joint cracking and loss of material properties due to thermal cycling over time. Also, there are losses associated with heat radiation from the hot end of these types of engines leading to inefficiency. The other type of cycles, such as Rankine which is used to describe steam turbine operation, is suitable only for large solar power plants with minimum power in the multi tens of MW range. These solar power plants are expensive and have a number of other problems such as maintenance of the reflecting optical surfaces.

BRIEF SUMMARY OF THE INVENTION

In various exemplary embodiments, the present invention provides an apparatus for collecting solar energy for electrical energy generation through one or more thermodynamic closed-cycle heat engines. The present invention includes new designs for solar collectors that concentrate solar energy, and mechanisms for transporting and transferring the concentrated solar energy directly into the working fluid (e.g., a liquid, a gas, or a phase change substance) of the closed cycle thermodynamic engines without heating the outside surface of the engines. In an exemplary embodiment, the present utilizes an inflatable design for a dual-surface reflector which provides low cost and weight, protection from external elements, and the ability to inflate/deflate as required.

In an exemplary embodiment of the present invention, a dual-surface reflector for collecting solar energy includes a primary reflector; a secondary reflector configured to receive solar energy reflected from the primary reflector and concentrate the solar energy; and an opening in the primary reflector, wherein the concentrated solar energy is provided by the secondary reflector to the opening; wherein the primary reflector and the secondary reflector each include inflatable components. The dual-surface reflector can further include a switch located at the opening, wherein the switch is configured to distribute the concentrated solar energy to one or more thermodynamic engines. Optionally, the dual-surface reflector further includes a support ring disposed around the edges of the primary reflector, wherein the support ring is configured to maintain a shape of the primary reflector. The dual-surface reflector can further include a transparent and flexible material disposed between the primary reflector and the secondary reflector, wherein the transparent and flexible material is substantially optically transparent in the infrared region. The transparent and flexible material forms a seal between the primary reflector and the secondary reflector providing protection from external elements. Optionally, the transparent and flexible material includes fluorinated ethylene propylene. The dual-surface reflector can further include a base supporting the primary reflector; and a tracking mechanism to point the primary reflector towards the sun. Optionally, the dual-surface reflector further includes an air pump configured to inflate the inflatable components. The dual-surface reflector can also further include a valve for connecting the air pump to the inflatable components and for deflating the inflatable components; and a microcontroller configured to control the air pump and the valve. Optionally, the primary reflector and the secondary reflector each include fluorinated ethylene propylene with a thin, highly reflective metal layer.

In another exemplary embodiment of the present invention, a dual-surface inflatable reflector for collecting solar energy includes an outer support ring; a primary reflector disposed to the outer support ring; a secondary reflector configured to receive solar energy reflected from the primary reflector and concentrate the solar energy, wherein the secondary reflector is disposed to a transparent and flexible material disposed to the outer support ring; and an opening in the primary reflector, wherein the concentrated solar energy is provided by the secondary reflector to the opening; and inflation means for inflating the outer support ring and an interior formed between the primary reflector, the opening, the secondary reflector, and the transparent and flexible material. The dual-surface inflatable reflector can further include solar tracking means for pointing the primary reflector towards the sun. Optionally, the dual-surface inflatable reflector further includes switching means for distributing the concentrated solar energy to one or more thermodynamic engines. The transparent and flexible material forms a seal between the primary reflector and the secondary reflector providing protection from external elements. Optionally, the transparent and flexible material includes fluorinated ethylene propylene.

In yet another exemplary embodiment of the present invention, a method of operating a solar collector includes inflating a reflector with a pump; positioning the reflector towards the sun; collecting solar energy with the reflector; concentrating the solar energy to an opening; and distributing the solar energy to one or more engines. The method can further include deflating the reflector responsive to one of a deactivation signal and a determination of inclement weather. Optionally, the method further includes storing the reflector in a base. The reflector can include a primary reflector; a secondary reflector configured to receive solar energy reflected from the primary reflector and concentrate the solar energy; and an opening in the primary reflector, wherein the concentrated solar energy is provided by the secondary reflector to the opening; wherein the primary reflector and the secondary reflector each comprise inflatable components. Optionally, the primary reflector and the secondary reflector each include fluorinated ethylene propylene with a thin, highly reflective metal layer.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

In various exemplary embodiments, the present invention provides an apparatus for collecting solar energy for electrical energy generation through one or more thermodynamic closed-cycle heat engines. The present invention includes new designs for solar collectors that concentrate solar energy, and mechanisms for transporting and transferring the concentrated solar energy directly into the working fluid (e.g., a liquid, a gas, or a phase change substance) of the closed cycle thermodynamic engines without heating the outside surface of the engines. In an exemplary embodiment, the present utilizes an inflatable design for a dual-surface reflector which provides low cost and weight, protection from external elements, and the ability to inflate/deflate as required.

Figure 1:
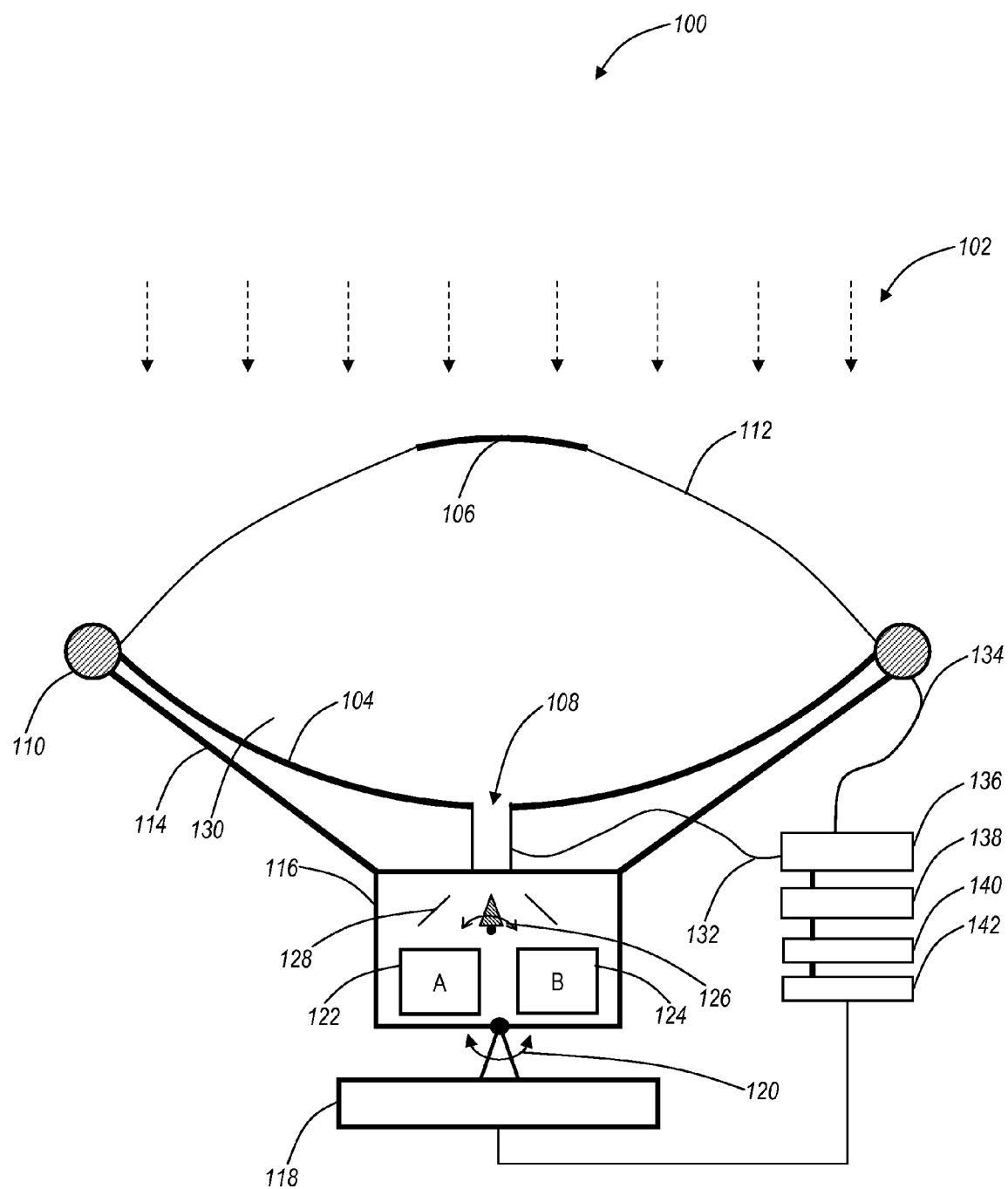
FIG. 1 is system schematic including a dual-surface reflector for collecting and concentrating solar energy according to an exemplary embodiment of the present invention.

Referring to FIG. 1, a dual-surface reflector 100 is illustrated for collecting and concentrating solar energy 102 according to an exemplary embodiment of the present invention. The dual-surfaces on the dual-surface reflector 100 include a primary reflector 104 and a secondary reflector 106. The reflectors 104, 106 can be in a parabolic shape, a spherical shape, and the like. Also, the secondary reflector 106 can be concave or convex depending on the positioning of the secondary reflector 106 relative to the primary reflector 104. The primary reflector 104 is pointed towards the solar energy 102, and the secondary reflector 106 is located above the primary reflector 104. The primary reflector 104 is configured to reflect the solar energy 102 to the secondary reflector 106 which in turn concentrates the solar energy 102 through an opening 108 at a center of the primary reflector 104.

An outer perimeter support ring 110 is disposed around the edges of the primary reflector 104 to maintain the shape of the primary reflector 104 and to anchor in place the primary reflector 104. A transparent and flexible material 112 connects to the primary reflector 104 and to the support ring 110 to hold the secondary reflector 106 in place. The transparent and flexible material 112 is configured to allow the solar energy 102 to pass through, and can be constructed from a material that is optically transparent in the infrared region, such as a material in the Teflon® family of products, for example, fluorinated ethylene propylene (FEP) or the like. The transparent and flexible material 112 provides a closed design of the dual-surface reflector 100. Advantageously, the transparent and flexible material 112 can seal the dual-surface reflector 100 from the elements, i.e. wind, airborne particles, dirt, bird droppings, etc. This prevents deterioration of the reflectors 104, 106 and reduces maintenance with respect to cleaning the reflectors 104, 106.

A support member 114 can be disposed to the outer perimeter support ring 110 and a base 116. The base 116 can connect to a tracking mechanism 118 through a rotatable member 120. The tracking mechanism 118 is configured to continuously point the reflectors 104, 106 towards the sun by initiating a rotation of the rotatable member 120 to rotate the base 116, the support member 114 and the support ring 110. For example, the tracking mechanism 118 can include a microcontroller or the like can rotate according to location (e.g., an integrated Global Positioning Satellite (GPS) receiver, preprogrammed location, or the like), date, and time or the like. Additionally, the tracking mechanism 118 can include feedback from sensors that detect the position of the sun.

The base 116 can include one or more motors and electric generators 122, 124. The opening 108 is connected to the base 116 to provide concentrated solar energy from the reflectors 104, 106 to the one or more motors and electric generators 122, 124. For a single motor and electric generator 122, the motor and electric generator 122 is positioned to allow the concentrated solar energy to enter working fluid (e.g., a liquid, a gas, or a phase change substance) without heating an outside surface of the single motor and electric generator 122. The one or more motors and electric generators 122, 124 can include a Stirling or Rankine type of engine or variations of these.

FIG. 1 illustrates an exemplary embodiment with two of the motors and electric generators 122, 124. This exemplary embodiment includes an optical switch 126 and reflecting surfaces 128 to direct the concentrated solar energy into each of the motors and electric generators 122, 124. Those of ordinary skill in the art will recognize that the base 116 can include more than two of the motors and electric generators 122, 124 with a corresponding optical switch 126 and reflecting surfaces 128 to concentrate solar energy into each of the more than two of the motors and electric generators 122, 124. The optical switch 126 is configured to provide concentrated solar energy for predetermined intervals into each of the motors and electric generators 122, 124.

Advantageously, the optical switch 126 enables the dual-surface reflector 100 to input energy into each of the motors and electric generators 122, 124 in a pulsating manner only when needed and for a duration of time that is completely controllable. This enables the dual-surface reflector 100 to avoid wasting collected solar energy, i.e. the optical switch 126 enables the collected energy to be used in each of the motors and electric generators 122, 124 as needed. For example, the optical switch 126 can be configured to direct collected solar energy into a heating chamber of each of the motors and electric generators 122, 124 only during a heating cycle. The motors and electric generators 122, 124 each have offset heating cycles to allow all collected solar energy to be used, i.e. the optical switch 126 cycles between each of the motors and electric generators 122, 124 for their individual heating cycles.

In an exemplary embodiment, the dual-surface reflector 100 can include inflatable components, such as an inflatable portion 130 between the primary reflector 104 and the secondary reflector 106 and in the outer perimeter support ring 110. Air lines 132, 134 can be connected to the inflatable portion 130 and the outer perimeter support ring 110, respectively, to allow inflation through a valve 136, a pressure monitor 138, and an air pump 140. Additionally, a microcontroller 142 can be operably connected to the air pump 140, the pressure monitor 138, the valve 136, the tracking mechanism 118, etc. The microcontroller 142 can provide various control and monitoring functions of the dual-surface reflector 100.

Collectively, the components 136, 138, 140, 142 can be located within the base 116, attached to the base 116, in the tracking mechanism 118, external to the base 116 and the tracking mechanism 118, etc. The valve 136 can include multiple valves, such as, for example, an OFF valve, an ON/OFF line 132/134 valve, an OFF/ON ON/OFF line 132/134 valve, and so on for additional lines as needed, or the valve 136 can include multiple individual ON/OFF valves controlled by the microcontroller 142.

The inflatable components can be deflated and stored, such as in a compartment of the base 114. For example, the inflatable components could be stored in inclement weather, high winds, and the like to protect the inflatable components from damage. The microcontroller 142 can be connected to sensors which provide various feedback regarding current conditions, such as wind speed and the like. The microcontroller 142 can be configured to automatically deflate the inflatable components responsive to high winds, for example.

The support member 114 and the outer perimeter support ring 110, collectively, are configured to maintain the desired shape of the primary reflector 104, the secondary reflector 106, and the transparent and flexible material 112. The pressure monitor 138 is configured to provide feedback to the microcontroller 142 about the air pressure in the inflatable portion 130 and the outer perimeter support ring 110. The dual-surface reflector 100 can also include controllable relief pressure valves (not shown) to enable the release of air to deflate the dual-surface reflector 100. The transparent and flexible material 112 can form a closed space 130 which is inflated through the air line 132 to provide a shape of the secondary reflector 106, i.e. air is included in the interior of the dual-surface reflector 100 formed by the transparent and flexible material 112, the secondary reflector 106 and the primary reflector 104.

Advantageously, the inflatable components provide low cost and low weight. For example, the inflatable components can reduce the load requirements to support the dual-surface reflector 100, such as on a roof, for example. Also, the inflatable components can be transported more efficiently (due to the low cost and ability to deflate) and stored when not in use (in inclement weather, for example).

In another exemplary embodiment, the primary reflector 104, the support member 114, the outer perimeter support ring 110, the transparent and flexible material 112, etc. could be constructed through rigid materials which maintain shape. In this configuration, the components 136, 138, 140 are not required. The microcontroller 142 could be used in this configuration for control of the tracking mechanism 118 and general operations of the dual-surface reflector 100.

In both exemplary embodiments of the dual-surface reflector 100, the microcontroller 142 can include an external interface, such as through a network connection or direct connection, to enable user control of the dual-surface reflector 100. For example, the microcontroller 142 can include a user interface (UT) to enable custom settings.

The primary reflector 104 can be made from a flexible material such as a polymer (FEP) that is metalized with a thin, highly reflective metal layer that can be followed by additional coatings that protect and create high reflectance in the infrared region. Some of the metals that can be used for depositing a thin reflector layer on the polymer substrate material of the inflatable collector can include gold, aluminum, silver, or dielectric materials. Preferably, the surface of the primary reflector 104 is metalized and coated such that it is protected from contamination, scratching, weather, or other potentially damaging elements.

The secondary reflector 106 surface can be made in the same manner as the primary reflector 104 with the reflecting metal layer being deposited onto the inside surface of the secondary reflector 106. For improved performance, the secondary reflector 106 can be made out of a rigid material with a high precision reflective surface shape. In this case the, the secondary reflector can be directly attached to the transparent and flexible material 112 or be sealed to it (impermeable to air) around the perimeter of the secondary reflector 106. Both the primary reflector 104 and the secondary reflector 106 can utilize techniques to increase surface reflectivity (such as multi-layers) to almost 100%.

The dual-surface reflector 100 operates by receiving the solar energy 102 through solar radiation through the transparent and flexible material 112, the solar radiation reflects from the primary reflector 104 onto the secondary reflector 106 which collimates or slightly focuses the solar radiation towards the opening 108. One or more engines (described in FIG. 5) can be located at the opening 108 to receive the concentrated solar radiation (i.e., using the optical switch 126 and the reflectors 128 to enable multiple engines). The collimated or focused solar radiation from the secondary reflector 106 enters through optically transparent window on the engines towards a hot end (solar energy absorber) of a thermodynamic engine.

Advantageously, the dual-surface reflector 100 focuses the solar energy 102 and directs it into each of the motors and electric generators 122, 124 for their individual heating cycles in a manner that avoids heating engine components other than the solar energy absorber element in the heating chamber of the motors and electric generators 122, 124. Specifically, the opening 108 extends to the optical switch 126 which directs the concentrated solar energy directly into each of the motors and electric generators 122, 124 through a transparent window of the heating chamber. The materials forming the opening 108 and the transparent window include materials with absorption substantially close to zero for infrared radiation.

The dual-surface reflector 100 includes a large volume, and is preferably suitable for open spaces. For example, the dual-surface reflector 100 could be utilized in open-space solar farms for power plants, farms, etc. In an exemplary embodiment, the dual-surface reflector 100 could be four to six meters in diameter. Alternatively, the dual-surface reflector 100 could be a reduced size for individual home-use. Advantageously, the light weight of the inflatable components could enable use of the dual-surface reflector 100 on a roof. For example, a home-based dual-surface reflector 100 could be 0.1 to one meters in diameter. Also, the reduced cost could enable the use of the dual-surface reflector 100 as a backup generator, for example.

Figure 2:
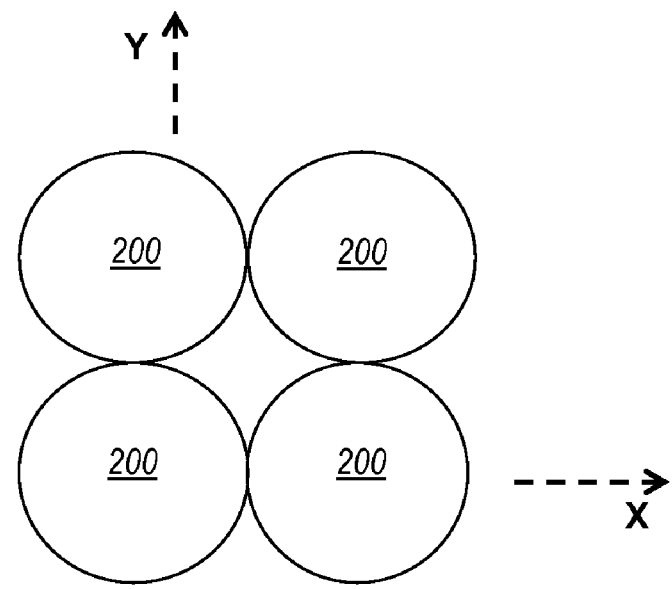
FIG. 2 are multiple low-profile solar collectors for providing a flatter and compact low-profile arrangement according to an exemplary embodiment of the present invention.
Figure 2:
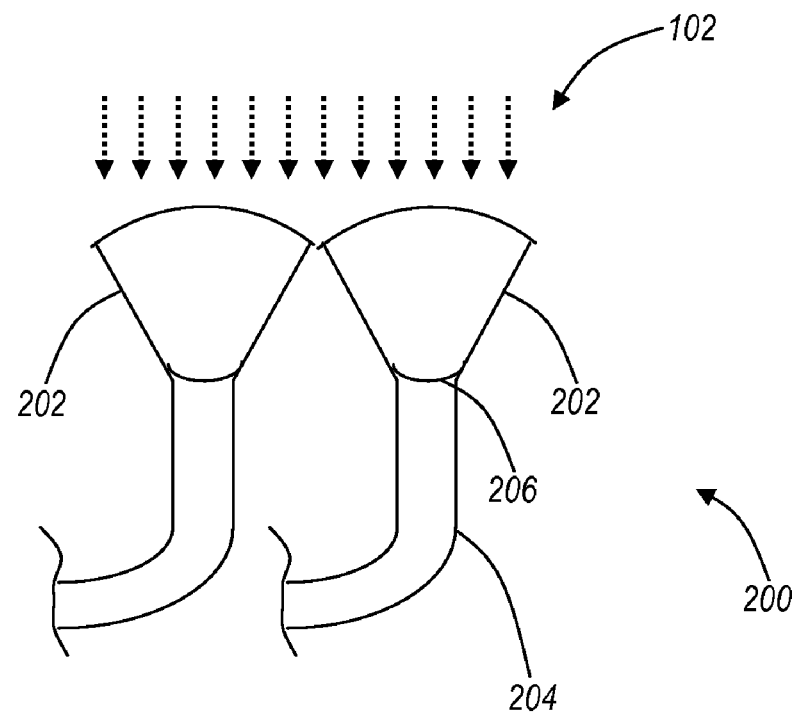
Figure 4:
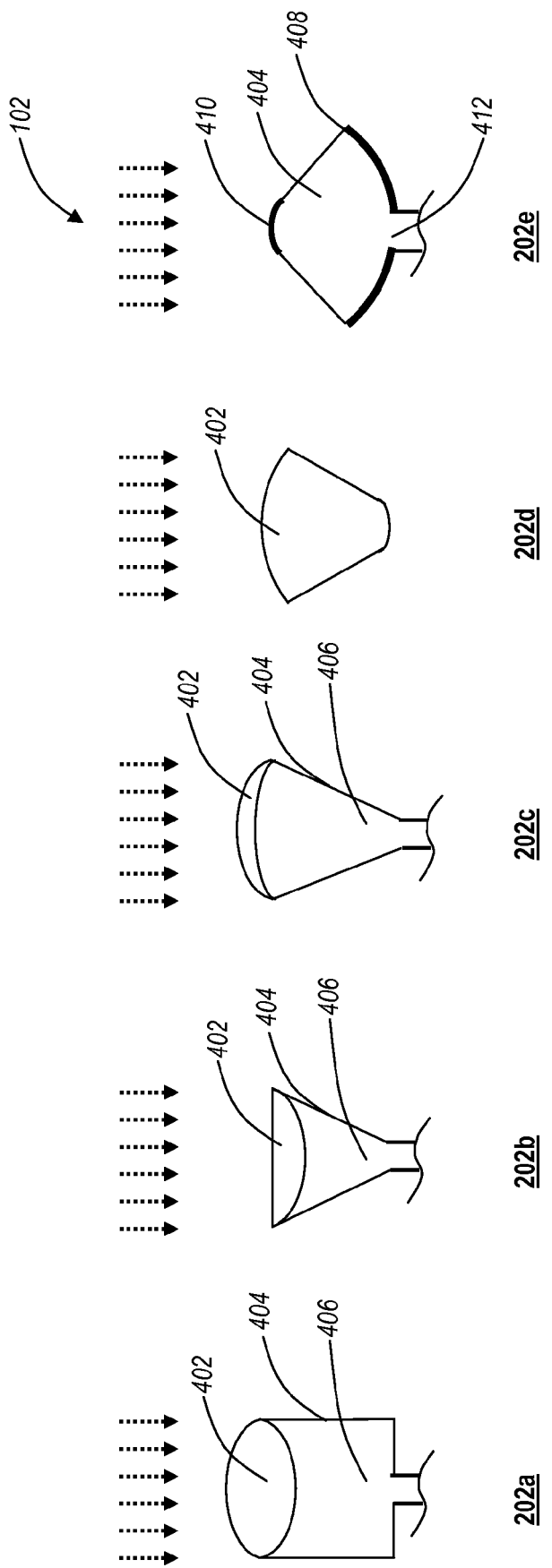
FIG. 4 is a diagram of various designs for a focusing/collimating element according to an exemplary embodiment of the present invention.

Referring to FIG. 2, multiple solar collectors 200 are illustrated for providing a flatter and compact arrangement, i.e. a low-profile design, according to an exemplary embodiment of the present invention. FIG. 2 illustrates a top view and a side view of the multiple solar collectors 200. In the top view, the multiple solar collectors 200 can be arranged side-by-side along an x- and y-axis. Each of the solar collectors 200 includes a focusing/collimating element 202 which is configured to concentrate solar radiation 102 into a corresponding light guide 204. The focusing/collimating element 202 is illustrated in FIG. 2 with an exemplary profile, and additional exemplary profile shapes are illustrated in FIG. 4.

The focusing/collimating element 202 focuses the solar radiation 102 into a cone of light with a numerical aperture smaller than the numerical aperture of the light guide 204. The focusing/collimating element 202 can be made out of a material transparent to infrared solar radiation, such as FEP. The focusing/collimating element 202 can be a solid material or hollow with a flexible skin that allows the element 202 to be formed by inflating it with a gas. Forming the element though inflation provides weight and material costs advantages.

The light guides 204 can be constructed out of a material that is optically transparent in the infrared region, such as FEP, glass, or other fluorinated polymers in the Teflon® family, or the light guides 204 can be made out of a thin tube (e.g., FEP) filled with a fluid, such as Germanium tetrachloride or Carbon tetrachloride, that is transparent to infrared radiation. Advantageously, the light guides 204 include a material selected so that it has close to zero absorption in the wavelengths of the solar energy 102. The tube material must have a higher index of refraction than the fluid inside it in order to create a step index light guide that allows propagation of the concentrated solar radiation. The array of the multiple solar collectors 200 can extend in the X and Y direction as needed to collect more solar energy.

The focusing/collimating element 202, the light guide 204 and the interface 206 can be rotatably attached to a solar tracking mechanism (not shown). The tracking mechanism is configured to ensure the focusing/collimating element 202 continuously points toward the sun. A microcontroller (not shown) similar to the microcontroller 142 in FIG. 1 can control the tracking mechanism along with other functions of the multiple solar collectors 200. The tracking mechanism can individually point each of the focusing/collimating elements 202 towards the Sun, or alternatively, a group tracking mechanism (not shown) can align a group of elements 202 together.

Figure 3:
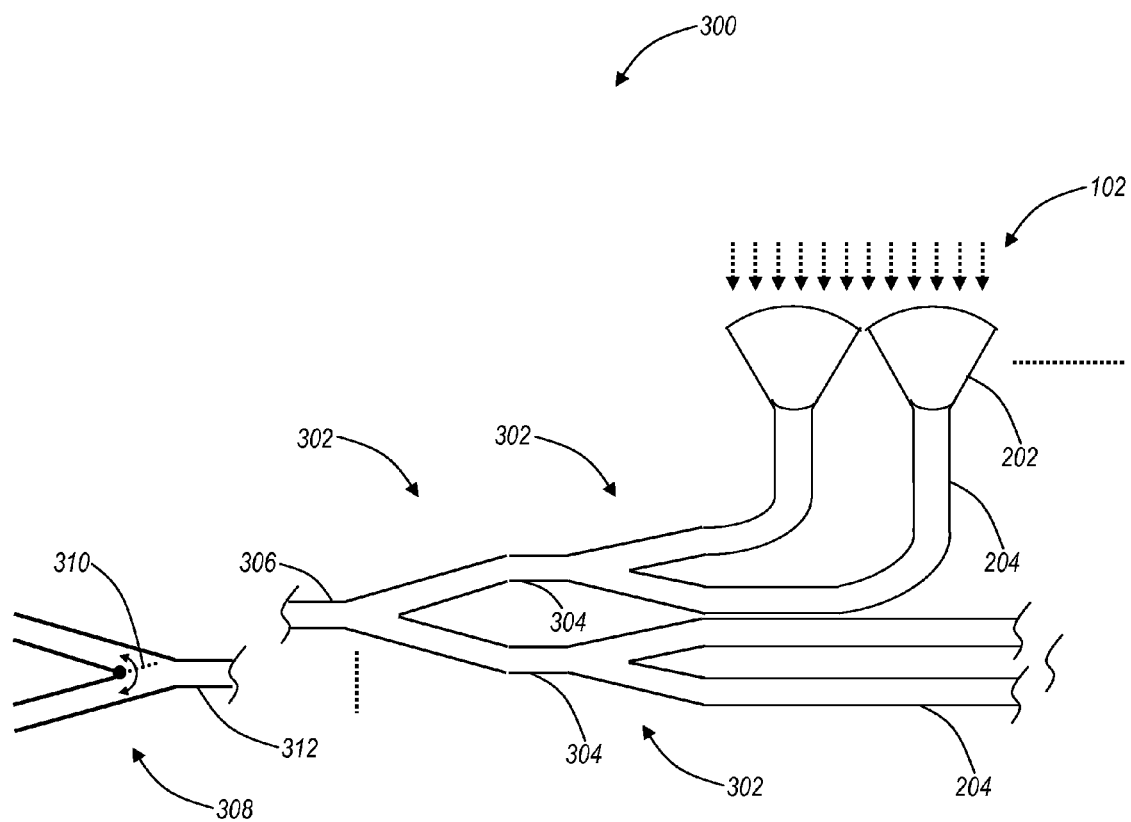
FIG. 3 is a mechanism for combining solar radiation from multiple low-profile solar collectors through light guides according to an exemplary embodiment of the present invention.

Referring to FIG. 3, a mechanism 300 is illustrated for combining solar radiation 102 from the multiple light guides 204 in FIG. 2 according to an exemplary embodiment of the present invention. The multiple light guides 204 are configured to receive concentrated solar radiation from the focusing/collimating elements 202 and to guide it and release it inside a hot end of one or more thermodynamic engines. Optical couplers 302 can be utilized to combine multiple light guides 204 into a single output 304. For example, FIG. 3 illustrates four total light guides 204 combined into a single output 306 through a total of three cascaded optical couplers 302. Those of ordinary skill in the art will recognize that various configurations of optical couplers 302 can be utilized to combine an arbitrary number of light guides 204. The optical couplers 204 which are deployed in a tree configuration in FIG. 3 reduce the number of light 204 guides reaching the thermodynamic engine. Alternatively, each light guide 204 could be directed separately into the thermodynamic engines.

An optical splitter 308 and an optical switch 310 can also be included in the optical path (illustrated connected to a light guide 312 which includes a combination of all of the light guides 204) at an optimum location along each light guide 204 leading to the thermodynamic engines. The optical splitter 308 and optical switch 310 permit pulsation of the concentrated solar energy into multiple thermodynamic engines.

Each branch (e.g., two or more branches) of the optical splitter 308 leads to a different thermodynamic engine. The optical switch 310 sequentially directs the concentrated solar energy traveling along the light guide 312 into different arms of the optical splitter 308. For example, the multiple thermodynamic engines can include offset heating cycles with the optical splitter 308 and the optical switch 310 directing solar energy 102 into each engine at its corresponding heating cycle. Advantageously, this improves efficiency ensuring that collected solar energy 102 is not wasted (as would occur if there was a single engine because the single engine only requires the energy during the heating cycle).

The optical switch 310 can be integrated into the optical splitter 308 as indicated in FIG. 3 or it can exist independently in which case the optical splitter 308 could be eliminated and the optical switch 310 can have the configuration presented in FIG. 1 (i.e., optical switch 126 and reflecting surfaces 128). In the case where the optical switch 310 is independent of the light guide 312, the light guide termination is designed to collimate the light directed towards the optical switch 310. The selection of the optimum points where the optical splitters 308 are inserted depends on the power handling ability of the optical switch 310 and on economic factors. For example, if the optical switch 310 is inserted in the optical path closer to the thermodynamic engine, then fewer switches 310 and shorter light guides 204 are needed, but the optical switches 310 need to be able to handle higher light intensities.

Referring to FIG. 4, various designs are illustrated for the focusing/collimating element 202a-202e according to an exemplary embodiment of the present invention. The focusing/collimating element 202a, 202b, 202c each include an optically transparent solid material 402 shaped in either a bi-convex (element 202a), a plano-convex (element 202b), and a meniscus form (element 202c), all of which have the purpose to focus the incoming solar energy 102. Additionally, each of the elements 202a, 202b, 202c also include a flexible "skin" material 404 that together with the optically transparent solid material 402 form an inflatable structure 406 which can be inflated with air or a different gas. The air/gas pressure in the inflatable structure 406 can be dynamically controlled to maintain an optimum focal distance between the solid material 402 and the thermodynamic engine. The optically transparent solid material 402 and the flexible "skin" material 404 are made out of a material transparent to visible and infrared solar radiation, such as FEP, for example. The focusing/collimating element 202d is a solid convex focusing element constructed entirely of the optically transparent solid material 402.

The focusing/collimating element 202e includes an inflatable dual reflector including a primary reflecting surface 408 and a smaller secondary reflecting surface 410 inside an inflatable structure 406. The primary reflecting surface 408 and the secondary reflecting surface 410 are configured to collectively concentrate the solar radiation 102 into an opening 412 that leads to the light guide 204. Both reflecting surfaces 408, 410 can be rigid or flexible such as metalized films or only the secondary reflector 410 can be made out of a rigid material with a high precision reflective surface shape. In this case, the secondary reflector 410 can be directly attached to the transparent material 404 or can be sealed to it (impermeable to air) around the perimeter of the secondary reflector 410. Some of the metals that can be used for metalizing a thin reflector layer on the polymer substrate material of the inflatable collector can include gold, aluminum, silver, or dielectric materials. The preferred surface to be metalized is the inside of the inflatable solar collector such that it is protected from contamination, scratching, weather, or other potentially damaging elements.

Techniques to increase surface reflectivity (such as multi layer dielectric coatings) to almost 100% can be utilized. Again, the air/gas pressure can be dynamically controlled, based on feedback from pressure sensors monitoring the inside pressure of the inflatable focusing element, to maintain the optimum focal distance. All transparent materials through which solar radiation and concentrated solar radiation passes through can have their surfaces covered with broad band anti-reflective coatings in order to maximize light transmission. The designs of the focusing elements 202 presented in FIG. 3 are for illustration purposes and those of ordinary skill in the art will recognize other designs are possible that would meet the purpose and functionality of the focusing elements 202.

The multiple solar collectors 200 can be utilized in buildings, such as office buildings, homes, etc. For example, multiple focusing/collimating elements 202 can be placed on a roof with the light guides 204 extending into the building towards a service area, basement, etc. to one or more thermodynamic engines. Additionally, the light guides 204 heat up very little based upon their material construction. Advantageously, the low profile design of the solar collectors 200 enables roof placement and the light guides enable a separate engine location within a building.

Figure 5A:
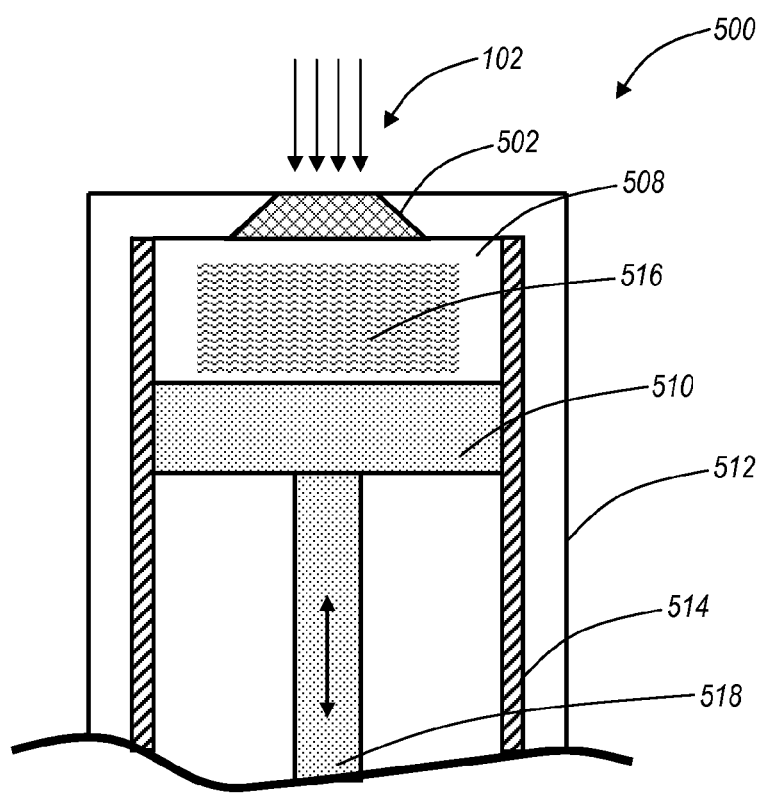
FIGS. 5A and 5B are partial cross-sectional views of a thermodynamic closed-cycle based engine according to an exemplary embodiment of the present invention.
Figure 5B:
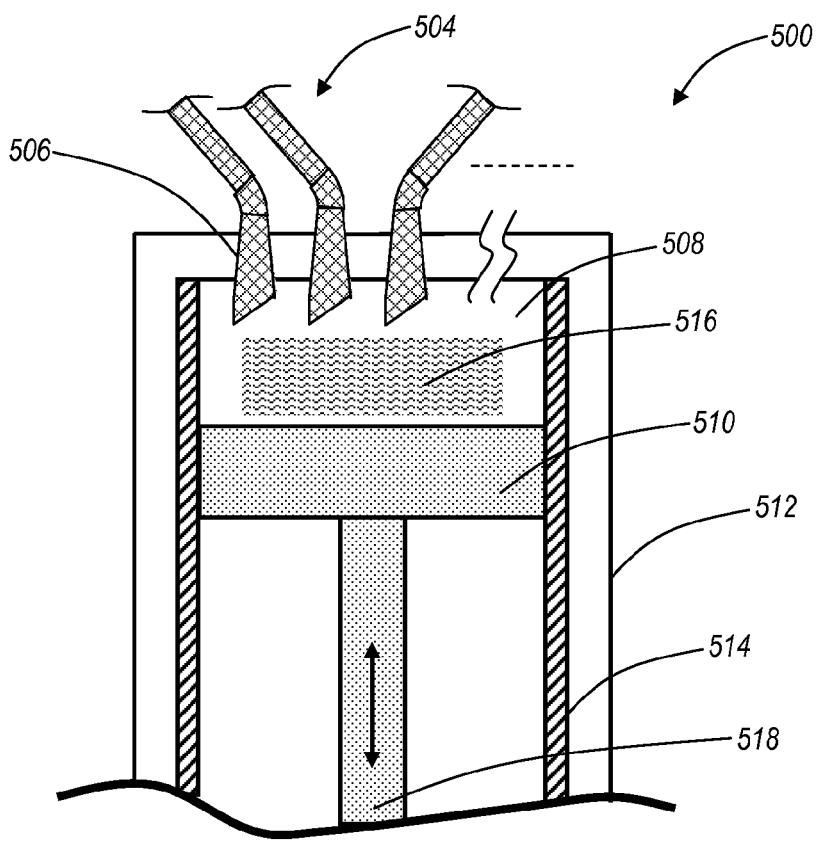

Referring to FIGS. 5A and 5B, a partial cross-sectional view illustrates a thermodynamic closed-cycle based engine 500 according to an exemplary embodiment of the present invention. FIG. 5A illustrates an exemplary embodiment where concentrated solar energy 102 travels through free space to enter the engine 500 through an optically transparent window 502. Also, multiple optically transparent windows 502 could be utilized. The optically transparent window 502 is made out of a material transparent to infrared radiation, such as sapphire, fused silica or the like. The shape of the optically transparent window 502 is such that it facilitates sealing of working fluid inside the engine 500 and reduction of back reflection. FIG. 5A shows a trapezoidal cross section of the optically transparent window 502 as an exemplary embodiment. The optically transparent window 502 can be disposed at an end of the opening 108 or placed adjacent to the reflecting surfaces 128 of the dual-surface reflector 100 in FIG. 1.

FIG. 5B illustrates an exemplary embodiment where concentrated solar radiation enters the engine 500 through a plurality of light guides 504. Each of the light guides 504 includes a termination 506 that is made out of material transparent to infrared radiation and that is also resistant to the high temperatures inside the engine 500. The shape of termination 506 facilitates sealing of working fluid inside the engine 506. FIG. 5B shows a trapezoidal cross section of the termination 506. The termination 506 has an angled tip inside the engine 500 that minimizes back reflection inside the light guide 504 and also minimizes coupling back into the light guide 506 of radiation from the engine 500. The termination 506 includes a very hard material with good optical properties able to withstand high temperatures. The plurality of light guides 504 can connect to the solar collectors 200 in FIGS. 2-4. Additionally, the engine can include fewer light guides 504 than solar collectors 200 utilizing the mechanism 300 in FIG. 3 to combine light guides 204.

The engine 500 can include a Stirling-type engine, a Rankine-type engine, or the like. A Stirling engine is a closed-cycle regenerative heat engine with a gaseous working fluid. The Stirling engine is closed-cycle because the working fluid, i.e., the gas in a heat chamber 508 which pushes on a piston 510, is permanently contained within the engine 500. This also categorizes it as an external heat engine which means it can be driven by any convenient source of heat. "Regenerative" refers to the use of an internal heat exchanger called a 'regenerator' which increases the engine's thermal efficiency compared to the similar but simpler hot air engine.

In both FIGS. 5A and 5B, the optically transparent window 502 and the plurality of light guides 504 transfer concentrated solar energy directly into the heat chamber 508 of the engine 500. Advantageously, this direct transfer provides a lower temperature of the engine 500 and reduced thermal stress on a body 512 of the engine 500. The engine 500 can include a liner 514 made out of a material that is a reflector of infrared radiation and at the same time has poor thermal conductivity (thermal insulator). Advantageously, the liner 514 keeps heat inside the engine 500 avoiding excessive heating of the engine body. This leads to longer engine life, better reliability, increased efficiency, and the like.

The heat chamber 508 is delimited at one end by the piston 510 which moves in a reciprocating manner inside the engine 500. The efficiency of the engine 500 is improved in the present invention because the outside temperature of the hot end of the engine 500 is greatly reduced (compared to conventional designs) and therefore the radiated heat loss is decreased. Inside the heat chamber 508, the concentrated solar radiation is absorbed and the energy heats up the working fluid in the chamber. The working fluid can be a gas (typically pressurized), steam, a phase change material, or any other working fluid utilized in closed-cycle thermodynamic engines. The optically transparent window 502 can be shaped in a trapezoidal shape or the like to seal the heat chamber 508, i.e. through the pressurized gas. Alternatively, seals can be located on the optically transparent window 502 or around the plurality of light guides 504.

The heat chamber 508 includes an energy absorber and gas heater 516 which is designed to have a large surface area. The energy absorber and gas heater 516 is made out of a material that absorbs infrared radiation and can efficiently release it to the working fluid such as graphite or other type of carbon-based material, a suitable metal, a metal oxide, or the like. The energy absorber and gas heater 516 can include carbon nano particles or other nano size particles uniformly distributed and suspended in the working fluid.

The engine 500 also includes one or more heat exchangers for cooling the gas inside the heat chamber 508 at an appropriate time during the thermodynamic cycle. One or more linear generators or the like (not shown) can be coupled to a rod 518 of the pistons 510. Generally, the generators are configured to convert mechanical energy from the pistons 510 into electrical energy. The electrical energy can be distributed for use or stored for future use.

The engine 500 is shown for illustration purposes. Those of ordinary skill in the art will recognize that the dual-surface reflector 100 and the multiple solar collectors 200 can be utilized to concentrate and directly deliver solar energy into any type of engine. Of note, the present invention delivers concentrated solar energy directly into the heat chamber 508 to avoid heating the engine body.

Advantageously, the designs described herein enable distributed electrical energy generation from a few kWs to 10's of kW per unit at a low cost. The present invention can directly generate Alternating Current (AC) electricity without a need for inverters. Also, the present invention can provide heat output which can be used, for example, for space heating, water heating, air conditioning, micro desalination plants, and the like. The present invention provides low installation costs and low overall maintenance costs. Additionally, the present invention can enable a modular design, such as adding additional solar collectors as needed to scale energy generation.

Figure 6:
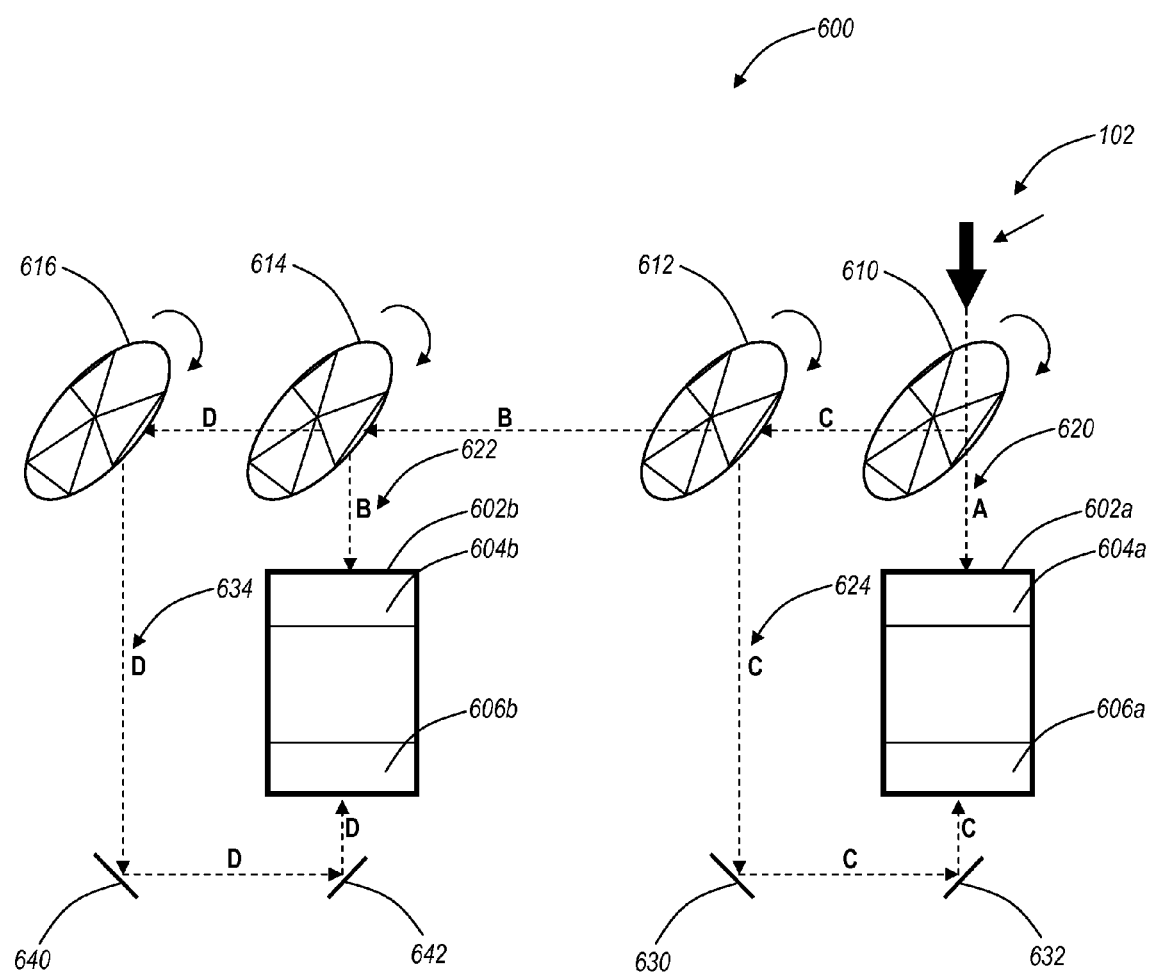
FIG. 6 is a diagram of an energy distribution and delivery system for concentrated solar energy directly into thermodynamic closed-cycle based engines according to an exemplary embodiment of the present invention.

Referring to FIG. 6, an energy distribution and delivery system 600 is illustrated for concentrated solar energy that allows the release of the concentrated solar energy in a pulsating manner directly into thermodynamic closed-cycle based engines according to an exemplary embodiment of the present invention. The energy distribution and delivery system 600 is illustrated with two exemplary closed-cycle thermodynamic engines 602a, 602b, and those of ordinary skill in the art will recognize the energy distribution and delivery system 600 could use additional closed-cycle thermodynamic engines 602.

Each of the closed-cycle thermodynamic engines 602a, 602b includes a first heating chamber 604a, 604b and a second heating chamber 606a, 606b. The energy distribution and delivery system 600 is configured to maximize usage of collected solar energy 102 by distributing the solar energy 102 to each heating chamber 604a, 604b, 606a, 606b at appropriate times in their respective cycles. For example, the solar energy 102 can be collected utilizing the dual-surface reflector 100 and/or the multiple solar collectors 200 described herein.

The energy distribution and delivery system 600 includes multiple reflective disks 610, 612, 614, 616 for distributing the collected solar energy 102. Note, these reflective disks 610, 612, 614, 616 could be included within a light guide, for example. Additionally, the optical switch and splitter described herein could provide similar functionality to the reflective disks 610, 612, 614, 616. The reflective disks 610, 612, 614, 616 are configured to either reflect or pass through the collected solar energy 102. Additionally, each of the reflective disks 610, 612, 614, 616 is configured to rotate to either reflect or pass through the collected solar energy 102.

FIG. 6 illustrates an exemplary operation of the energy distribution and delivery system 600. The collected solar energy 102, during a time period 620 (following a dashed line A), passes through an opening of the first disk 610 and enters the heating chamber 604a of the engine 602a. During a time period 622 (following a dashed line B), the concentrated solar energy 102 is reflected off the first disk 610, passes through the second disk 612, and reflects off the third disk 616 to enter the heating chamber 604b of the engine 602b.

During a time period 624 (following a dashed line C), the concentrated solar energy 102 reflects off the first disk 610, reflects off the second disk 612, and reflects off reflectors 630, 632 to enter the heating chamber 606a of the engine 602a. The reflectors 630, 632 are positioned to direct the concentrated solar energy 102, and light guides could also be utilized. During a time period 634 (following a dashed line D), the concentrated solar energy 102 reflects off the first disk 610, passes through the second disk 612 and the third disk 614, and reflects off the fourth disk 616 and reflective surfaces 640, 642 to enter the heating chamber 606b of the engine 602b.

The cycle can then start all over again. The energy distribution and delivery system 600 can be used for one, two, or more engines chained in a similar fashion. The size and shape of the reflecting surfaces on each individual disk can be tailored for obtaining optimum performance. For example, the duration of the energy input in any chamber 604a, 604b, 606a, 606b can be adjusted by varying the size of the reflecting surface (or a combination of multiple reflecting surfaces) and the rotational speed of the disk 610, 612, 614, 616. The energy distribution and delivery system 600 can include motors (not shown) configured to rotate the disks 610, 612, 614, 616. The pulsating manner of energy transfer allows the solar energy to enter into the chamber of the engine periodically, for a controllable period of time, similar to turning a switch ON and OFF. Also, the energy distribution and delivery system 600 can utilize the optical splitter 308 and the optical switch 310 in a similar fashion as the reflective disks 610, 612, 614, 616 to distribute the solar energy 102.

Figure 7:
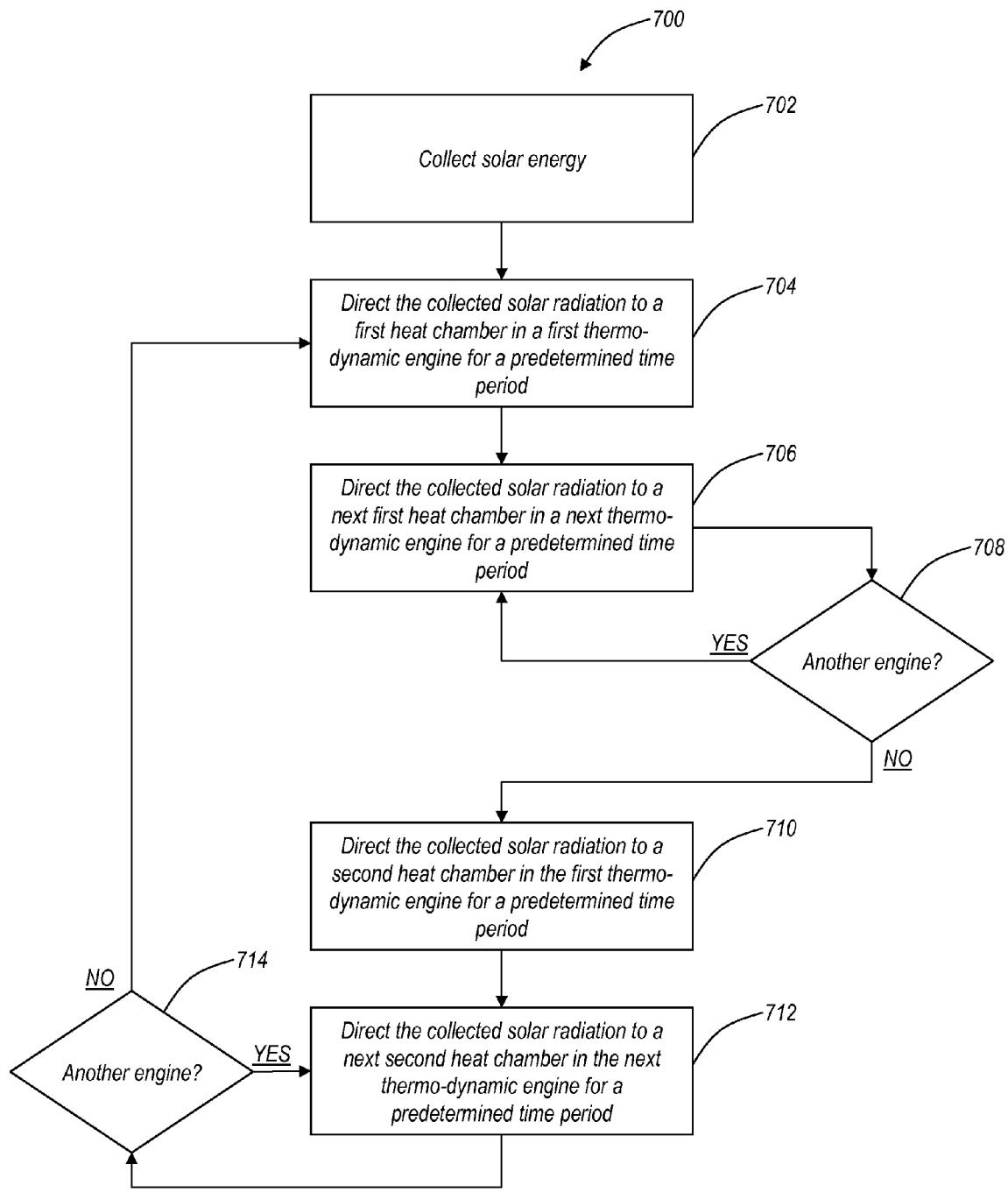
FIG. 7 is a flowchart of an energy distribution and delivery mechanism for concentrating and releasing solar energy in a pulsating manner directly into thermodynamic closed-cycle based engines according to an exemplary embodiment of the present invention.

Referring to FIG. 7, a flowchart illustrates an energy distribution and delivery mechanism 600 for concentrating and releasing solar energy in a pulsating manner directly into thermodynamic closed-cycle based engines according to an exemplary embodiment of the present invention. The distribution and delivery mechanism 600 collects solar energy (step 702). The collection step can include the mechanisms described herein with respect to the dual-surface reflector 100 and/or the multiple solar collectors 200.

Next, the distribution and delivery mechanism 600 directs the collected solar energy to a first heat chamber in a first thermodynamic engine for a predetermined time period (step 704). The predetermined time period can correspond to a heating cycle for the first thermodynamic engine. After the predetermined time period, the collected solar energy is directed to a next first heat chamber in a next thermodynamic engine for another predetermined time period (step 706).

The distribution and delivery mechanism 600 checks if there is another thermodynamic engine (step 708). Here, the distribution and delivery mechanism 600 is configured to cycle through all of the thermodynamic engines to provide collected solar energy into the associated first heat chambers of each engine. If there is another engine, the distribution and delivery mechanism 600 returns to step 706.

If not, the distribution and delivery mechanism 600 directs the collected solar energy to a second heat chamber in the first thermodynamic engine for a predetermined time period (step 710). Then, the distribution and delivery mechanism 600 directs the collected solar energy to a next second heat chamber in the next thermodynamic engine for a predetermined time period (step 712).

The distribution and delivery mechanism 600 checks if there is another thermodynamic engine (step 714). Here, the distribution and delivery mechanism 600 is configured to cycle through all of the thermodynamic engines to provide collected solar energy into the associated second heat chambers of each engine. If there is another engine, the distribution and delivery mechanism 600 returns to step 716. If not, the distribution and delivery mechanism 600 can return to step 704 for another cycle through each of the heat chambers.

Figure 8:
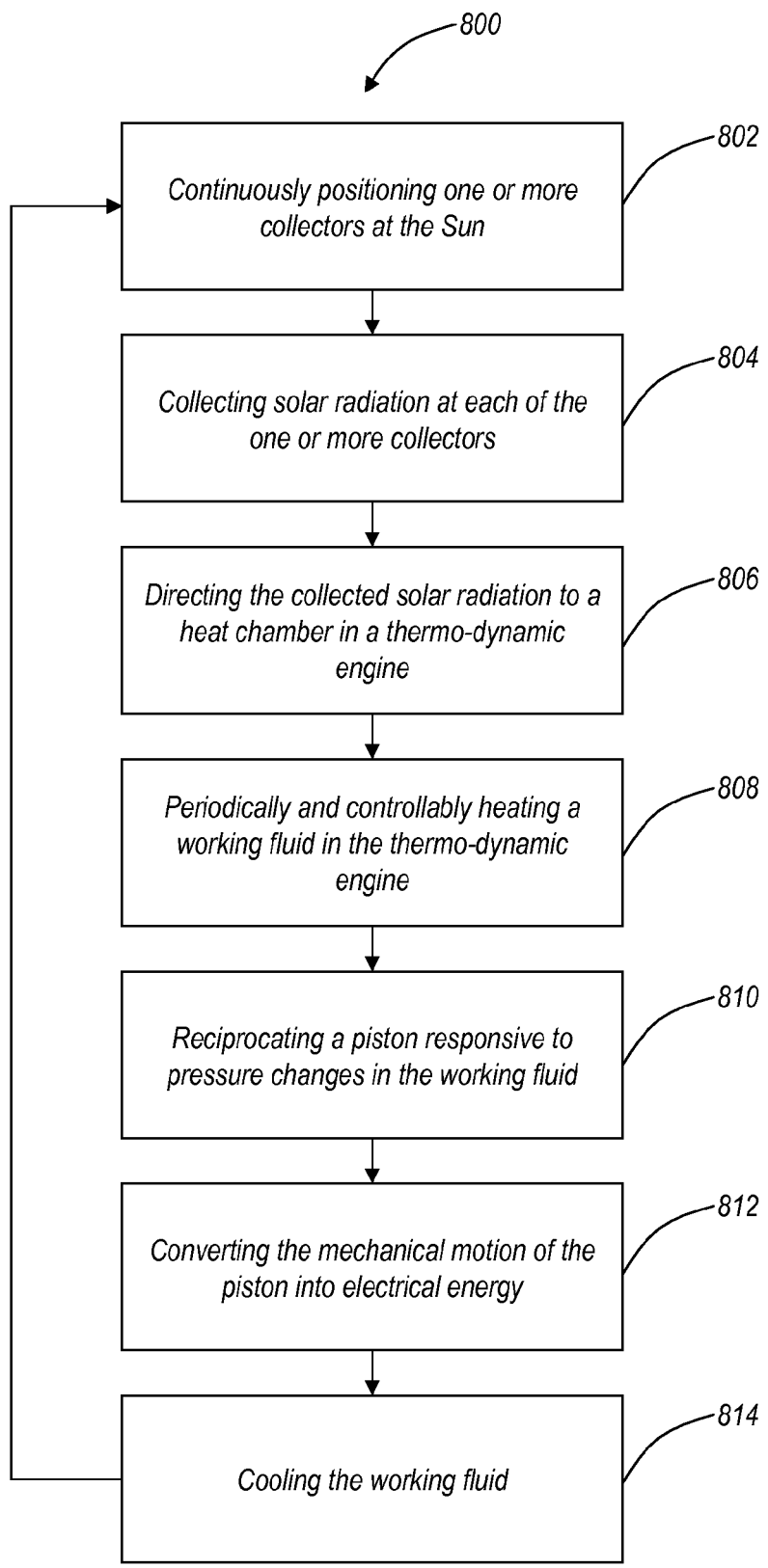
FIG. 8 is a flow chart of a mechanism to convert solar energy into electric energy according to an exemplary embodiment of the present invention.

Referring to FIG. 8, a flow chart illustrates a mechanism 800 to convert solar energy into electric energy according to an exemplary embodiment of the present invention. The mechanism 800 includes continuously positioning one or more solar collectors towards the sun (step 802). Collecting solar radiation at each of the one or more solar collectors (step 804). Directing the collected solar radiation to a heat chamber in a thermo-dynamic engine (step 806). Periodically and controllably heating a working fluid in the thermo-dynamic engine with the directed solar radiation (step 808). Reciprocating a piston responsive to pressure changes in the working fluid (step 810). Converting the mechanical motion of the piston into electrical energy (step 812). Cooling the working fluid (step 814), and repeating the mechanism 800.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A dual-surface reflector for collecting solar energy, the dual-surface reflector comprising:
    a primary reflector;
    a secondary reflector configured to receive solar energy reflected from the primary reflector and concentrate the solar energy to a point;
    an opening in the primary reflector, wherein the concentrated solar energy is provided by the secondary reflector to the opening; and
    a mechanism coupled to the opening configured to directly provide the concentrated solar energy to working fluid to avoid heating an outside surface;
    wherein the primary reflector and the secondary reflector each comprise inflatable components configured to inflate and deflate, and wherein the mechanism is configured to provide the concentrated solar energy external to the inflatable components.

2. The dual-surface reflector of claim 1, further comprising:
    a switch located at the opening, wherein the switch is configured to distribute the concentrated solar energy directly to heat chambers of two or more thermodynamic engines.

3. The dual-surface reflector of claim 1, further comprising:
    a support ring disposed around the edges of the primary reflector, wherein the support ring is configured to maintain a shape of the primary reflector.

4. The dual-surface reflector of claim 1, further comprising:
    a transparent and flexible material disposed between the primary reflector and the secondary reflector, wherein the transparent and flexible material is substantially optically transparent in the infrared region.

5. The dual-surface reflector of claim 4, wherein the transparent and flexible material forms a seal between the primary reflector and the secondary reflector providing protection from external elements.

6. The dual-surface reflector of claim 4, wherein the transparent and flexible material comprises fluorinated ethylene propylene.

7. The dual-surface reflector of claim 1, further comprising:
    a base supporting the primary reflector; and
    a tracking mechanism to point the primary reflector towards the sun, wherein the primary reflector configured to move in a multi-axis configuration.

8. The dual-surface reflector of claim 1, further comprising:
    an air pump configured to inflate the inflatable components.

9. The dual-surface reflector of claim 8, further comprising:
    a valve for connecting the air pump to the inflatable components and for deflating the inflatable components;
    a microcontroller configured to control the air pump and the valve.

10. The dual-surface reflector of claim 1, wherein the primary reflector and the secondary reflector each comprise fluorinated ethylene propylene with a thin, highly reflective metal layer.

11. A dual-surface inflatable reflector for collecting solar energy, the dual-surface inflatable reflector comprising:
    an outer support ring;

a primary reflector disposed to the outer support ring;
a secondary reflector configured to receive solar energy reflected from the primary reflector and concentrate the solar energy to a point, wherein the secondary reflector is disposed to a transparent and flexible material disposed to the outer support ring; and
an opening in the primary reflector, wherein the concentrated solar energy is provided by the secondary reflector to the opening;
a light guide coupled to the opening configured to directly provide the concentrated solar energy to working fluid to avoid heating an outside surface; and
inflation means for inflating and deflating the outer support ring and an interior formed between the primary reflector, the opening, the secondary reflector, and the transparent and flexible material, wherein the light guide is configured to provide the concentrated solar energy external to inflatable components.

12. The dual-surface inflatable reflector of claim 11, further comprising:
solar tracking means for pointing the primary reflector towards the sun.

13. The dual-surface inflatable reflector of claim 11, further comprising:
switching means for distributing the concentrated solar energy directly to heat chambers of two or more thermodynamic engines.

14. The dual-surface inflatable reflector of claim 11, wherein the transparent and flexible material forms a seal between the primary reflector and the secondary reflector providing protection from external elements.

15. The dual-surface inflatable reflector of claim 14, wherein the transparent and flexible material comprises fluorinated ethylene propylene.

16. A method of operating a solar collector, the method comprising:
inflating a reflector with a pump, the reflector is configured to inflate and deflate;
positioning the reflector towards the sun;
collecting solar energy with the reflector;
concentrating the solar energy to a point at an opening; and
distributing using light guides the solar energy directly to working fluid in heat chambers of two or more engines in a pulsating manner thereby preventing heating of an outside surface.

17. The method of claim 16, further comprising:
deflating the reflector responsive to one of a deactivation signal and a determination of inclement weather.

18. The method of claim 17, further comprising:
storing the reflector in a base.

19. The method of claim 16, wherein the reflector comprises:
a primary reflector;
a secondary reflector configured to receive solar energy reflected from the primary reflector and concentrate the solar energy; and
an opening in the primary reflector, wherein the concentrated solar energy is provided by the secondary reflector to the opening;
wherein the primary reflector and the secondary reflector each comprise inflatable components, and wherein the primary reflector and the secondary reflector are inflated by air between one another, the air causing the primary reflector and the secondary reflector to maintain shape with the concentrated solar energy used to heat the working fluid external to the inflatable components.

20. The method of claim 19, wherein the primary reflector and the secondary reflector each comprise fluorinated ethylene propylene with a thin, highly reflective metal layer.

* * * * *